US011552971B1

(12) United States Patent
Karak et al.

(10) Patent No.: US 11,552,971 B1
(45) Date of Patent: Jan. 10, 2023

(54) DETECTION OF FRAUDULENT USE OF CONTENT DELIVERY NETWORK SERVED BYTE STREAMS

(71) Applicant: Amazon Technologies, Inc., Seattle, WA (US)

(72) Inventors: Samrat Karak, Bothell, WA (US); Prashant Verma, Seattle, WA (US); Ronil Sudhir Mokashi, Mercer Island, WA (US); Karthik Uthaman, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 288 days.

(21) Appl. No.: 16/904,098

(22) Filed: Jun. 17, 2020

(51) Int. Cl.
*H04L 9/40* (2022.01)
*G06N 5/04* (2006.01)
*G06N 20/00* (2019.01)

(52) U.S. Cl.
CPC .......... *H04L 63/1425* (2013.01); *G06N 5/04* (2013.01); *G06N 20/00* (2019.01); *H04L 63/1441* (2013.01)

(58) Field of Classification Search
CPC . H04L 63/1425; H04L 63/1441; G06N 20/00; G06N 5/04
See application file for complete search history.

(56) References Cited

U.S. PATENT DOCUMENTS

| | | | |
|---|---|---|---|
| 10,498,655 B1 * | 12/2019 | Nitzan | H04L 41/0896 |
| 2013/0067109 A1 * | 3/2013 | Dong | H04N 21/64723 709/231 |
| 2017/0098219 A1 * | 4/2017 | Peram | H04L 67/306 |
| 2017/0270179 A1 * | 9/2017 | Jiang | G06F 16/24568 |
| 2017/0353477 A1 * | 12/2017 | Faigon | G06F 21/6209 |
| 2021/0144164 A1 * | 5/2021 | Mathur | H04L 67/10 |
| 2021/0374144 A1 * | 12/2021 | Tudoran | G06F 16/24568 |
| 2022/0114437 A1 * | 4/2022 | Watt | G06F 16/953 |
| 2022/0158926 A1 * | 5/2022 | Wennerström | H04L 43/20 |

* cited by examiner

*Primary Examiner* — Mohamed A. Wasel
(74) *Attorney, Agent, or Firm* — Nicholson De Vos Webster & Elliott LLP

(57) ABSTRACT

Techniques for detection of the fraudulent use of content delivery network (CDN) served byte streams are described. A fraud detection service obtains CDN log data, distribution data, and account data and uses elements therefrom to perform a distribution-centric fraud analysis using machine learning techniques. Based on the likelihood of fraud determined by the analysis, the fraud detection service can rapidly perform actions to address the fraud, such as the termination of service for the distribution, throttling of resources provided for the distribution, or further investigation techniques.

20 Claims, 9 Drawing Sheets

EXEMPLARY LOG
DATA TYPES
505

- REQUEST VOLUME (E.G., REQUESTS/SECOND)
- BANDWIDTH (E.G., USED IN LAST MINUTE, 5 MINUTES, ETC.)
- REFERRER (E.G., URL, DOMAIN, IP ADDRESS)
- IP ADDRESSES / NETWORKS OF REQUESTING CLIENTS
- NUMBER OF CLIENTS REQUESTING CONTENT
- REQUESTING DEVICE TYPES
- DATA OBJECTS REQUESTED
- NETWORK/GEOGRAPHIC LOCATIONS OF REQUESTING DEVICES

EXEMPLARY
DISTRIBUTION
CHARACTERISTIC
TYPES
510

- FILENAME OF MANIFEST FILE
- MANIFEST / OBJECTS PROTECTED VIA DIGITAL RIGHTS MANAGEMENT?
- FILE TYPES OF DATA OBJECTS
- DISTRIBUTION CREATION DATE/TIME
- ORIGIN IDENTIFIER (OR PORTION THEREOF) OF DATA OBJECTS
- ATTRIBUTES OF THE ORIGIN IDENTIFIER (E.G., LENGTH, PATTERNS)

EXEMPLARY
ACCOUNT DATA
TYPES
515

- ACCOUNT RISK SCORE
- AGE OF ACCOUNT
- PAYMENT SOURCE/TYPE (E.G., PREPAID CARD)
- NAME
- MAILING ADDRESS (OR PORTION, E.G., ZIP CODE)
- EMAIL ADDRESS (OR PORTION, E.G., DOMAIN)
- PHONE NUMBER (OR PORTION, E.G., AREA CODE)
- GOVERNMENT IDENTIFIER (E.G., TAX ID, SSN)
- CREDIT SCORE
- ASSOCIATED ACCOUNTS (E.G., ASSOCIATED WITH "COMPANY X")
- ASSOCIATED ACCOUNT RISK SCORE, ETC.

*FIG. 5* though, in some cases, may be even longer. It has been observed that the total amount of traffic involved with this type of fraudulent use is remarkably high and is a significant problem for content providers and CDN providers.

DETECTION OF FRAUDULENT USE OF CONTENT DELIVERY NETWORK SERVED BYTE STREAMS

BACKGROUND

Computing devices typically utilize one or more communication networks to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf of, or for the benefit of, the general public.

Existing routing and addressing technologies can enable multiple data centers to provide similar or identical content to client computing devices. In some instances, each data center providing a set of content may be referred to as a point-of-presence (POP) of a content delivery system (or other organization) providing the content. Content delivery systems (sometimes referred to as "content delivery networks" or "CDNs") often attempt to connect users to a geographically "nearby" (to the user) POP, as such connections are commonly much faster than connections between the user and geographically-distant POPs or other computing systems. Accordingly, a CDN may implement POPs over a wide area—e.g., worldwide—and route requests for content to "nearby" POPs for fulfillment. For example, a CDN customer may host a set of files (often referred to as a "distribution") for a web page through the CDN. The CDN replicates ones or all of the set of files for the web page in potentially many locations, such as in a POP in Tokyo and another POP in London so that a user in the United Kingdom would be served the web page from the London POP while a user in Japan would be served the web page from the Tokyo POP.

Each POP may be associated with an address on a computing network, such as an Internet Protocol (IP) address. However, requests for content are generally addressed to a human-readable identifier, such as a universal resource identifier (URI) or domain name. To enable use of human-readable identifiers in accessing content, a client computing device can interact with a Domain Name System (DNS) that operates to resolve a domain name into a corresponding network address (e.g., an IP address). Typically, a CDN is associated with one or more domain names, and an operator of CDN will have authority to alter DNS records specifying IP addresses to which those domain names resolve. Thus, the operator of a CDN can utilize DNS records to control how requests to access content of the CDN are routed to POPs.

BRIEF DESCRIPTION OF DRAWINGS

Various embodiments in accordance with the present disclosure will be described with reference to the drawings, in which:

FIG. 5 is a diagram illustrating exemplary log data types, distribution characteristic types, and account data types useful for the detection of the fraudulent use of content delivery network served byte streams according to some embodiments.

DETAILED DESCRIPTION

Figure 1:
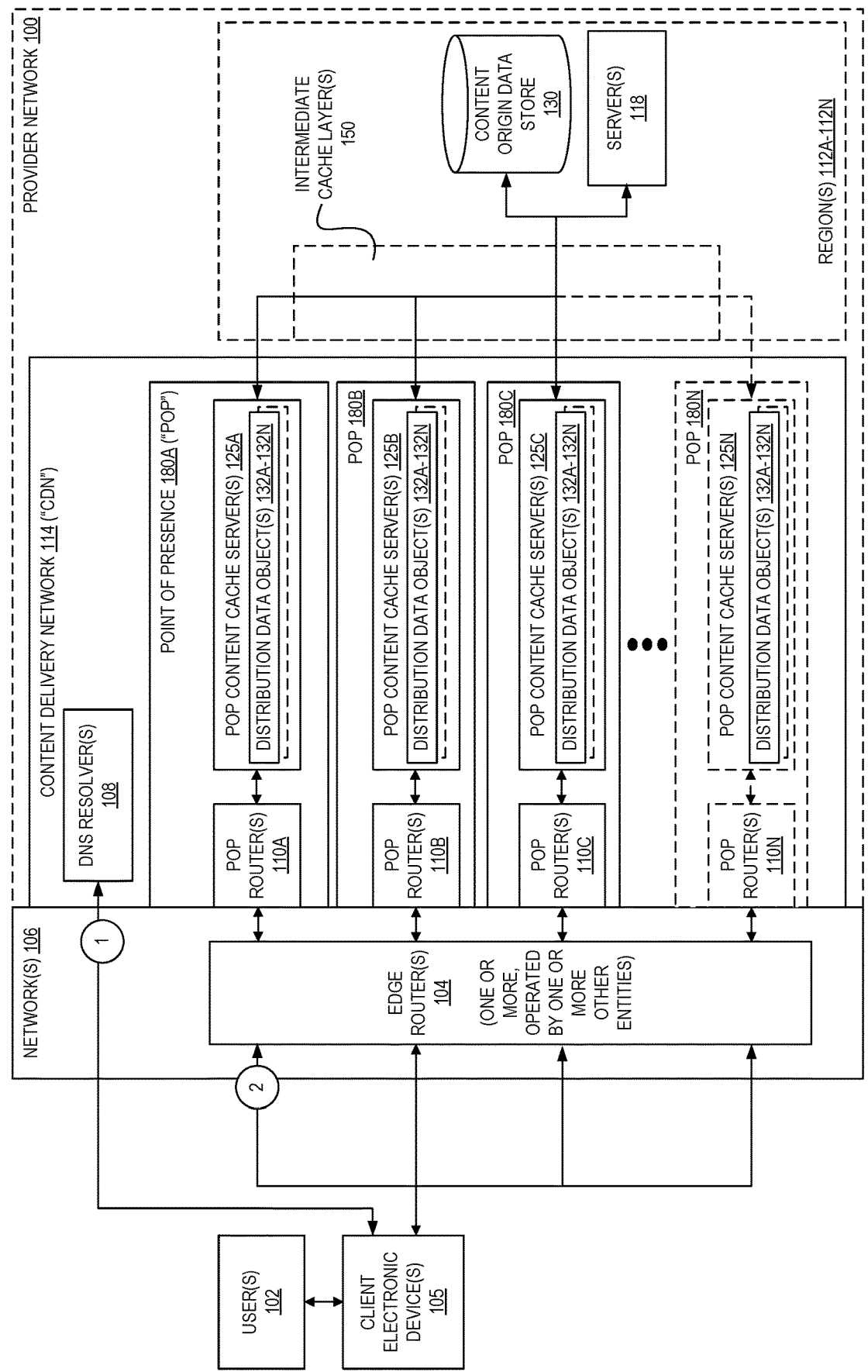
FIG. 1 is a diagram illustrating an environment including point of presence (POP) locations for content provider networks (CDNs) according to some embodiments.

The present disclosure relates to methods, apparatus, systems, and non-transitory computer-readable storage media for detection of fraudulent use of Content Delivery Network (CDN) served byte streams. According to some embodiments, a fraud detection service gathers data pertaining to distributions, CDN logs involving traffic of those distributions, and account data of accounts creating the distributions, and can analyze this data to identify likely fraudulent users of the CDN, e.g., illegitimate media streams served for fraudulent accounts. In some embodiments, the fraud detection service uses elements of this data with one or more machine learning models to generate distribution fraud scores, the values of which can be used to identify particular actions in response to be taken to address and/or verify the likely fraudulent use.

Commonly, fraudsters often use CDNs to stream pirated content (e.g., live sports videos). Two significant problems, among others, result from this fraud. First, during these live events, the fraudulent usage of the CDN consumes the available CDN bandwidth, which affects the ability of the CDN to properly serve legitimate traffic. Second, the revenue loss from the fraudulent use affects both the CDN's continued ability to function as well as the media owners whose content is being streamed without permission.

Some approaches to identifying the fraudulent use of CDN or provider network resources involve identifying users who sign up for an account with the intention to avoid making payments toward their service usage. Thus, via an analysis, an account may be marked fraudulent and suspended once a fraud team confirms the fraud on the account. However, users may still be able to get past account-limited analysis, e.g., by using fraudulent information, hacking another user's account, and/or by using the information of a person not having a negative or problematic history. Thus, fraudsters may able to "survive" past such a check—if one is able to even be performed in time—and use the CDN fraudulently for a brief duration of time (e.g., a portion of an hour to a few hours) to illegally stream media content.

Accordingly, the fraud may not even be detected until the event is complete and the associated streaming has similarly ended.

Embodiments disclosed herein can provide a rapid and multi-faceted investigation into such types of time-limited, but high resource utilization (in terms of requests and bandwidth) fraudulent uses of CDNs by analyzing both actual traffic utilization of the CDN together with additional information about the distribution itself (potentially without even accessing the content itself) and/or the account that created the distribution, resulting in a complete picture of the use. Accordingly, instead of only detecting a fraudulent use minutes or hours after the use has completed and the fraudster has moved on, embodiments can quickly detect and react to fraudulent uses using automated and/or human-involved processes.

FIG. 1 is a diagram illustrating an environment including POP locations for CDNs according to some embodiments. In FIG. 1, a CDN 114 is illustrated that includes multiple geographically distributed point of presence (POP) 180A-180N locations including POP routers 110A-110N and POP content cache servers 125A-125N, which provide high availability and performance by distributing a service or computing resources spatially relative to end users 102. The POPs 180A-180N may cache and provide access to data objects 132A-132N (e.g., files, other data structures, etc.) of one or more content "distributions" to thereby act as a "front-end" to computing resources at another location, e.g., data objects from a content origin data store 130, server(s) 118, etc., which may be implemented in one or more regions 112A-112N of a provider network 100.

In some embodiments, the CDN 114 may be offered by or in connection with a provider network 100 and implement aspects of a DNS service. A DNS service may be, for example, a highly-available and scalable cloud DNS web service that gives developers and organizations a reliable way to route end users to Internet applications by translating domain names, via one or more DNS resolvers 108, into the numeric network addresses that computing systems use to connect to each other. The DNS service may be an authoritative DNS service that can operate to connect user requests to infrastructure running in the provider network 100, such as compute instances of a hardware virtualization service, virtual load balancers, object stores, etc., and may be used to route users to infrastructure inside or outside of the provider network 100. The DNS service may also implement DNS health checks to route traffic to healthy endpoints or to independently monitor the health of applications and its endpoints. A DNS service may also manage traffic globally through a variety of routing scheme types, including latency-based routing, Geo DNS, geo-proximity, round robin, weighted round robin, etc., which can be combined with DNS failover techniques in order to enable a variety of low-latency, fault-tolerant architectures. Aspects of a DNS service—such as DNS resolvers 108—can be implemented according to a variety of architectures, and thus may be implemented within the CDN 114, within a region 112A of the provider network 100, or at another location.

A service provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, CDNs, Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc.

The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud service provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

In some embodiments, a cloud provider network is formed as a number of regions, where a region is a geographical area in which the cloud provider clusters data centers. Each region includes multiple (e.g., two or more) availability zones (AZs) connected to one another via a private high-speed network, for example a fiber communication connection. An AZ provides an isolated failure domain including one or more data center facilities with separate power, separate networking, and separate cooling from those in another AZ. AZs within a region are positioned far enough away from one other that a same natural disaster (or other failure-inducing event) should not affect or take more than one AZ offline at the same time. Customers can connect to AZ of the cloud provider network via a publicly accessible network (e.g., the Internet, a cellular communication network). Transit Centers (TC) are the primary backbone locations linking customers to the cloud provider network and may be co-located at other network provider facilities (e.g., Internet service providers, telecommunications providers). Each region can operate two or more TCs for redundancy.

Figure 2:
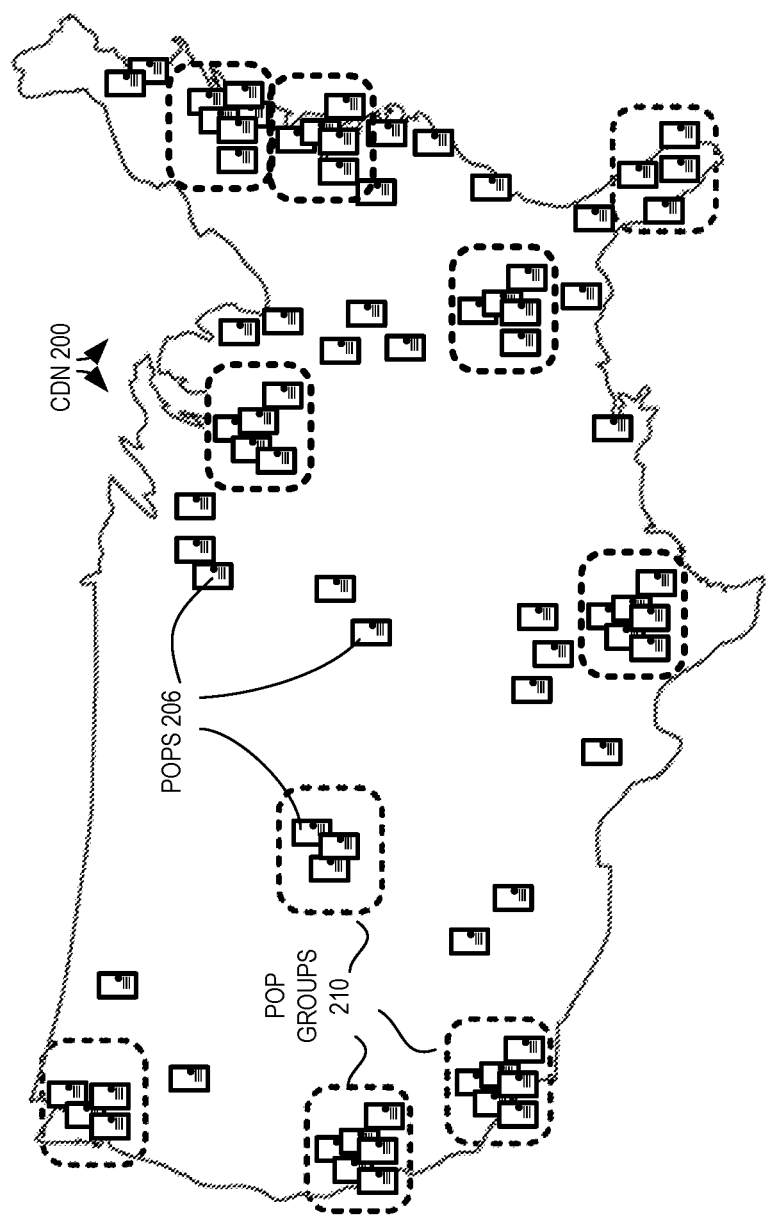
FIG. 2 illustrates an exemplary cloud provider network including geographically dispersed POPs according to some embodiments.

As shown, a provider network 100 includes one or more POPs 180A-180N to facilitate content distribution by caching content in the form of distribution data objects 132A-132N closer to end-users. POPs 180A-180N, which may be referred to as one type of "edge location" of the provider network 100, are typically geographically dispersed across cities, states, geographic areas, countries, etc. For example, FIG. 2 illustrates an exemplary CDN 200 including geographically dispersed POPs 206 according to some embodiments. As illustrated, FIG. 2 includes a map of the United States and surrounding areas overlaid with multiple POPs 206, though it is to be understood that POPs may be deployed differently than as shown, in different locations, etc., and thus this illustration is exemplary. The CDN 200, in some embodiments, may be a service of a cloud provider network and/or act as a frontend to resources within the cloud provider network.

In comparison to the number of regional data centers or availability zones, the number of POPs 206 can be much higher. Such widespread deployment of POPs can provide low-latency connectivity to resources (e.g., files, streams, etc.) for a much larger group of end user devices (in comparison to those that happen to be very close to a regional data center). In some embodiments, each POP 206 location can be peered to some portion of the cloud provider network 200 (e.g., a parent availability zone or regional data center). Such peering allows the various components operating in the cloud provider network 200 to manage the compute resources of the POP location, and/or for the POP to have rapid and easy connectivity to the resources of the provider network. In some embodiments, a number of POPs 206 (e.g., two or more POPs) may make up a POP group 210, typically when they share connectivity and/or geographic similarities such that they each provide a relatively same level of service (e.g., latency) to end users in a geographic area.

Turning back to FIG. 1, customers of the provider network may host their content within the provider network (e.g., files or data objects) or distribute their content through the provider network (e.g., multimedia streams). The customers may thus configure "distributions" of content to be made available through a CDN 114, allowing the provider network to facilitate the distribution of that content to the customer's users 102 through use of the POPs 180A-180N. Thus, a user's 102 request for content (originated by a user's client electronic device 105) may be routed across one or more networks 106 (e.g., via switches, routers 104, and the like) to a POP router 110A-110N of a POP (e.g., POP 180A) that is geographically proximate to the source of the request (that is, the client), and thereafter to one or more POP content cache servers 125 that may fulfill the request from content cached within the POP (e.g., distribution data objects 132A-132N), when available, or obtain the content from a source of the content. In some embodiments, multiple POPs may be in a same geographic area, e.g., scattered around a city, state, collection of cities, or geographic region, and thus several POPs may all be "near" a client.

For example, the POP content cache server(s) (e.g., 125A) at a POP (e.g., 180A) may implement a multi-tier cache, in which a request is provided to a "level 1" cache server 125 having access to a small, fast cache of "hot" distribution data object resources of typically many different distributions. In some embodiments, these "level 1" cache resources may be kept in sync among multiple different "level 1" cache servers. If a requested data object resource is not available in this cache (e.g., due to not having been recently requested, or not being requested in a recent amount of time by a relatively large number of clients), the request may be sent to a "level 2" cache server 125 having comparatively more data object storage. If the requested distribution data object is found in this level two cache (or set of caches), it may be returned; otherwise, if the requested data object is still not found, the request may continue on to another cache server 125 that manages connections back to sources of data objects, e.g., to another one or more layers of intermediate cache 150 that optionally may be implemented within a region 112 of the provider network 100, and/or to one or more content data stores 130 and/or server(s) 118, to thus retrieve the data object.

POPs 180 thus represent geographically dispersed portions of the provider network 100, each capable of serving cached distribution data object content to end-users. Such content can include, for example, the web site of a customer of the operator of the provider network 100, a set of audiovisual files, streamed content, etc. For example, Company A can host its website—www.companya.com—from the provider network 100. The website content, e.g., text, images, scripts, video, markup, or other data, may be stored in a content origin data store 130. In some embodiments, the content origin data store 130 is a volume (or "bucket" or "folder" or other storage collection/location) of a storage service that provides data/storage resources (e.g., object storage, block-level storage, data archival storage, databases and database tables, etc.) using non-volatile storage media such as solid-state drives (SSDs). The content origin data store 130 may thus serve as the content source for caching by the POPs 180, though additionally or alternatively, one or more servers 118 (e.g., web servers executed by one or more server computing devices, which may or may not be within the provider network 100) may also act as a data object content source. In some embodiments, the content origin data store 130 and/or server(s) 188 are located within in a region 112 of the provider network 100 (e.g., as a server implemented by a service of the provider network 100 such as a compute instance run by a hardware virtualization service, a function run by a serverless on-demand code execution service, or the like), and/or within one of the POPs 180 or another "edge location", or even within an entirely different network altogether.

A user 102 may initiate a request for content hosted by (or otherwise made accessible by) the provider network 100 by, for example, commanding a web browser application executing on a client electronic device 105 to issue a HyperText Transfer Protocol (HTTP)-based request for a resource, utilizing another type of application that can fetch remote resources via HTTP, etc. Examples of such client electronic devices 105 include personal computers (PCs), cell phones, handheld messaging devices, laptop computers, set-top boxes, personal data assistants, electronic book readers, wearable electronic devices (e.g., glasses, wristbands, monitors), and the like.

As one example, the user 102 may have typed a portion of a Uniform Resource Locator (URL) or, more generally, a Uniform Resource Identifier (URI), including a full or partial domain (e.g., "www.example.com") into the address bar of a browser, clicked on a hyperlink displayed in a browser, opened another type of application, etc.

However, the client electronic device 105 may request a resource responsive to any associated user action, and thus may seek to request a resource on its own, e.g., due to its configuration, based on data it obtains from another source, etc. Thus, in some scenarios a client electronic device 105 could be another type of computing device, such as a server computing device, "smart" device or Internet of Things (IoT) device, etc.

To obtain the resource, the client electronic device 105 may issue a DNS address lookup request that identifies the domain ("www.example.com") to a DNS resolver server, which may be managed by the user's Internet Service Provider (ISP)—such as a cable Internet provider, a DSL broadband provider, or corporate network—or by another entity offering DNS lookup services.

Assuming the DNS resolver server is unaware of the mapping between the provided domain name and a network address associated therewith (e.g., it does not have such a mapping entry in its cache), the DNS resolver server may forward the request (to resolve www.example.com) to a non-illustrated DNS root name server, which may return identifiers of one or more name servers for the top level domain (TLD), and the DNS resolver server may again forward the request to one of the non-illustrated TLD name servers for ".com" domains. The name server for ".com" domains may then respond to the request with the names/network addresses of one or more name servers (e.g., DNS resolver 108) of the DNS service that are associated with the requested "example.com" domain Thus, the DNS resolver server chooses a name server (e.g., DNS resolver 108) and forwards the request for "www.example.com" to that name server.

Based on receipt of this forwarded request, the DNS resolver 108, at circle (1), may look in the "example.com" hosted zone for the "www.example.com" record, obtain an associated value—such as the IP address (e.g., 192.0.2.44) associated with a POP 180—and return this IP address to the DNS resolver server.

In some cases, this resolution (or identification of an IP address for a domain) may be based on an estimate or approximation of the location of the client electronic device 105 (e.g., using an IP address of the client, when available, or an identifier of the DNS resolver server). Thus, the DNS resolver 108 can provide a network address of an entry point of a POP 180 that can offer the user the best performance (e.g., due to geographic proximity to the client electronic device 105). For example, POP 180A might be located in San Francisco, Calif., whereas POP 180B might be located in Chicago, Ill. Assuming the client electronic device 105 is estimated to be in Oakland, Calif. (or in Northern California, the Bay Area, etc.), the DNS resolver 108 may return a network address associated with POP 180A due to it being more geographically "close" to the inferred or determined location associated with the client. Knowledge of the location of the client can also allow for location compliance, e.g., certain clients in certain geographic locations may or may not be able to access a particular object.

In some embodiments, DNS resolution (e.g., the resolution of a domain name into a network address) is domain-name independent. Requests for any domain name associated with a content delivery system can be responded to with a network address of any POP of the content delivery system. This assumption holds, for example, where all POPs of a content delivery system operate to provide access to any content associated with the content delivery system. Thus, any POP can function to service requests for any content of the content delivery system.

The DNS resolver server now finally has the IP address that the client needs and may return that value to the client electronic device 105. The DNS resolver server may also cache (store) the IP address for "example.com" for some amount of time so that it can respond more quickly the next time a client needs to resolve "example.com."

The client electronic device 105 then may send a request at circle (2) to obtain the resource at "www.example.com" using the network address (e.g., 192.0.2.44) that it resolved, which may correspond to a POP 180A location. Thus, the request is routed via the one or more networks 106 to the corresponding POP 180A, e.g., via one or more routers 104 of intermediate network(s) 106 that have exchanged routing information with POP routers 110A-110N so that they know which POP is associated with which network addresses. The POP 180A may then obtain (from within a cache server 125, intermediate cache 150, or via a data source such as content origin data store 130 and/or server(s) 118) and return the requested resource (e.g., a web page for www.example.com) to the client electronic device 105, which may then act upon the resource (e.g., a web browser displays the page). Although FIG. 1 illustrates one variant of POP-based resource caching and request fulfillment, other CDN architectures are possible.

It has been observed that during many broadcast live events, such as sporting events, live concerts, etc., and/or when new video content such as movies or television shows are released (or first made available for streaming from a streaming service), there is a large jump in fraudulent usage of CDNs to stream byte streams of this media content. For example, someone may obtain legitimate access to a content source (e.g., a stream of a live sporting event), but then use a CDN and/or provider network to illegally redistribute this content to other viewers—often for free—while attempting to earn money through displaying advertisements alongside this content.

This may occur, for example, by a fraudster opening up a new "burner" account with a provider network—possibly with fraudulent payment information, biographical information (e.g., names, addresses), etc. —and using this account to utilize provider network and/or CDN services during the duration of the streaming event. This scheme thus attempts to use the provider network and/or CDN resources for free (or, for very low cost, or using stolen payment credentials) during the illicit stream of the media content, thus running up a large expense (that will not be paid) and removing these resources from availability or use by legitimate users of the provider network and/or CDN. The illegitimate users then abandon the account at the conclusion of the stream (or upon detection of the scheme and subsequent termination of the account or resources), leaving the provider network and/or CDN with a large amount of resource utilization but nobody to pay for it.

One naive approach to preventing such fraudulent use is to make it more difficult to use CDN or provider network services, e.g., by requiring a large initial payment for a new account, or by waiting for an account to be old enough to have a history of appropriate usage before allowing additional usage. Thus, one could implement a throttle on new or questionable accounts (e.g., limits or constraints on usage), limiting the damage a fraudster could incur.

However, this naive approach is problematic in practice at least due to the fact that an important function of a CDN is to be able to allow legitimate users to respond to a sudden spike in traffic (e.g., a video stream going "viral"); thus, many users may observe a large spike (or determine that such a large spike is just about to happen) and quickly seek to rely on the CDN to accommodate the spike without having a substantial account history, and without running into artificial throttles or constraints that would make the CDN ineffective for its purpose.

Accordingly, embodiments disclosed herein can rapidly detect the existence of the fraudulent use of CDNs in an automated manner that can implement corresponding, appropriate remediation techniques selected based on the certainty of use being fraudulent. In some embodiments, a fraud detection service can obtain characteristics of distributions being served, log data reflecting actual CDN traffic characteristics of recent distribution-related activity, and/or customer account data associated with distributions being served. Collectively, elements of this data can be used as inputs to a special-purpose machine learning model trained, based on previous real-world data involving distributions served by the CDN, to identify fraudulent use through generating a fraud score. Based on the strength of the fraud score, a different responsive action can be implemented, ranging from terminating serving the distribution, throttling or otherwise degrading the quality or quantity of service for the distribution, triggering a further investigation into the distribution, and the like. Alternatively, or additionally, in some embodiments account-level actions can be triggered for accounts associated with a distribution having a sufficiently large fraud score, e.g., locking or freezing the account from being able to perform other actions (e.g., involving the CDN and/or other services provided by a provider network), removing or blocking access to resources associated with the account in the provider network, or the like.

In some embodiments, the analysis can be limited to focus on generating fraud scores for only a subset of all active distributions, such as only for a certain number (e.g., five hundred, one thousand, five thousand, or the like) of the most active distributions streaming media at a particular point in time, resulting in the detection of large-scale fraudulent users as rapidly as possible. Alternatively, or additionally, the detection can be implemented according to an ordering based on one or multiple factors—e.g., based on first analyzing distributions having the largest amount of recent bandwidth utilization, a highest amount of requests received per second for data objects of the distribution, largest growth of requests or bandwidth, etc. Similarly, this approach can ensure that the largest offenders are detected first, resulting in the largest problems being detected and remedied before attempting to examine much smaller fraudulent cases.

Figure 3:
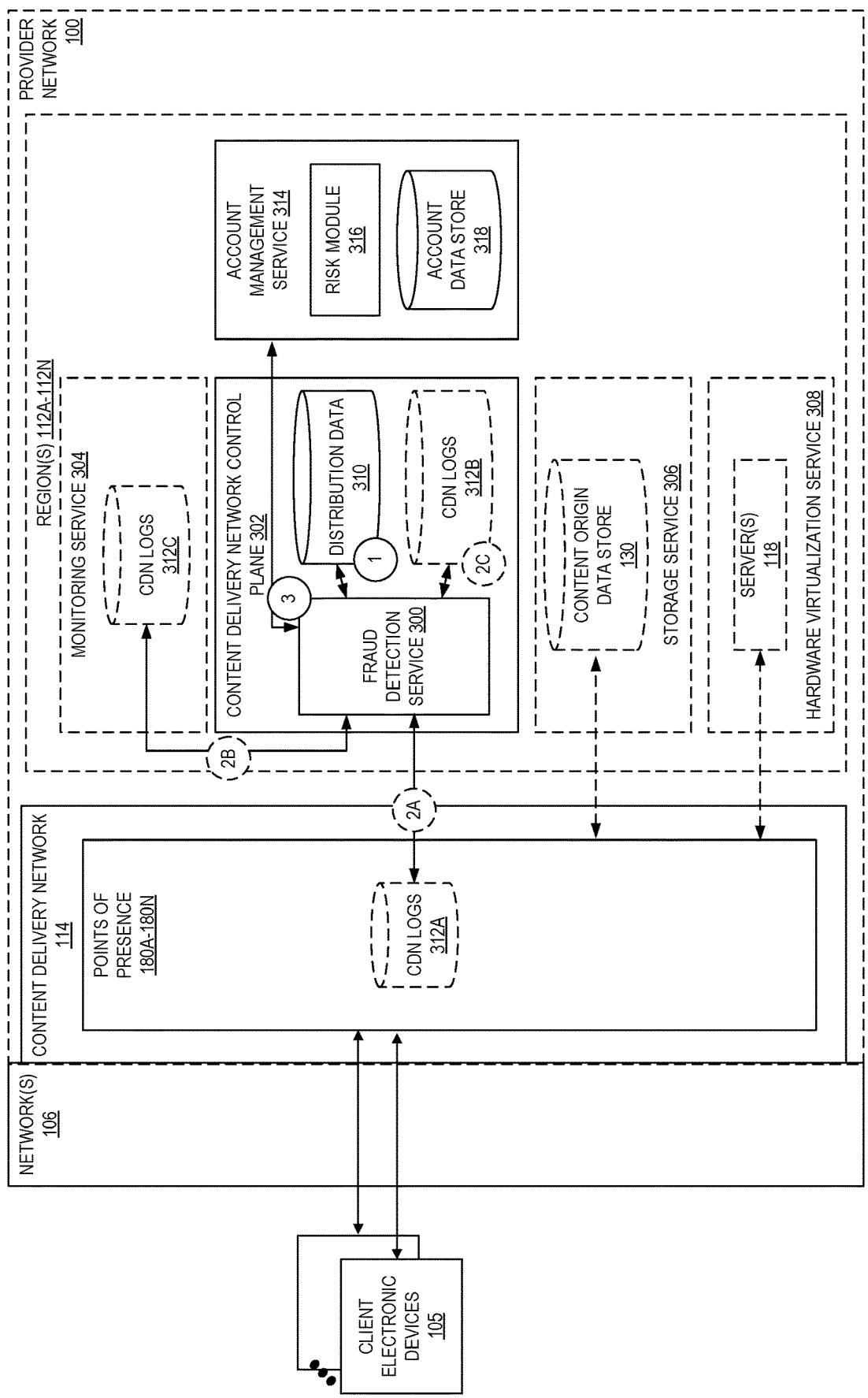
FIG. 3 is a diagram illustrating an environment for the detection of the fraudulent use of content delivery network served byte streams according to some embodiments.

As an example, FIG. 3 is a diagram illustrating an environment for the detection of the fraudulent use of content delivery network served byte streams according to some embodiments. In FIG. 3, a fraud detection service 300 implemented as part of a content delivery network control plane 302 can analyze distributions served by a content delivery network 114 to detect likely fraudulent uses of the CDN and allow for rapid responses thereto. The fraud detection service 300 may be implemented as software executed by one or multiple computing devices at one or multiple geographic locations and may be deployed within one or more regions 112 of a provider network 100.

The fraud detection service 300 may operate to identify distributions streaming media data (e.g., byte streams) via the CDN 114 in a likely fraudulent configuration, e.g., those illegally redistributing video content without proper permission, and which may likely attempt to avoid paying for the use of the CDN. The fraud detection service 300 may be able to detect such distributions using data describing the distributions themselves, using data associated with the customer account that created the distributions, as well as actual usage data describing the characteristics of the clients, requests, referring entities, traffic, etc., being streamed by the CDN for the distribution. By basing fraud analysis on multiple data elements across these types of data—and potentially based on different data elements to different degrees over time to account for changes in fraudulent activity patterns—embodiments can detect fraudulent distributions, over time, with a significantly higher recall and precision compared to previous approaches.

For example, as shown by circle (1), the fraud detection service 300 may obtain distribution data 310 pertaining to a distribution from a data store maintained by the CDN control plane 302, which may include various data elements such as filenames or filetypes of data objects in the distribution, filenames of manifest files in the distribution, creation dates and/or times of the distribution, an origin identifier (e.g., a URL, IP address, domain name, etc.) associated with the origin of the data objects in the distribution, attributes of the origin identifier (e.g., a length of a portion of the origin identifier (e.g., a subdomain), a pattern existing in the origin identifier, etc.), and the like.

As shown by circle (2A), (2B), and/or (2C), the fraud detection service 300 may also obtain CDN log data associated with the distribution, which may be obtained as CDN logs 312A from one or more POPs 180A-180N at circle (2A), as CDN logs 312C from a monitoring service 304 within a region of the provider network that stores logs or events associated with the distributions at circle (2B), and/or a set of CDN logs 312B at circle (2C) stored by the CDN control plane 302 obtained previously from the POPs 180. The CDN log data elements may include data describing recent usage events associated with the distribution, such as data pertaining the numbers, types, or locations of clients accessing the distribution; the numbers, types, and/or frequencies of requests for data objects of the distribution, and the like.

Further, as shown at circle (3), the fraud detection service 300 may obtain account data associated with the account that created the distribution from an account management service 314, which may be stored in an account data store 318 (e.g., one or more databases) that tracks account information, and/or a risk module 316 (e.g., using an algorithm, statistical model, ML model, etc.) that can generate an account risk score indicating an amount of risk (e.g., a likelihood such as a percentage confidence value) that an account is fraudulent, that the account will not pay for service, that the account is performing illegal or non-permissible activity via the provider network, or the like. This risk score may thus reflect a risk amount associated with an account for the CDN and/or provider network as a whole, and thus be associated with the account (as opposed to being directly associated with a particular distribution, as is the focus of the fraud detection service 300 in some embodiments described herein). The account risk score may be based on information associated with the account, such as the age of the account, an email address associated with the account, an IP address of the person/client setting up the account, mailing or billing address information associated with the account, etc., and could flexibly be created in a variety of ways by those of skill in the art.

Using one or more data elements from the account data, CDN log data, and distribution characteristic data, the fraud detection service 300 can generate a distribution risk score indicating a likelihood that the distribution is associated with a fraudulent act, e.g., streaming byte data for an unpermitted audiovisual stream without the intention of legitimately paying for service. This generation may involve the use of machine learning models, as described herein, which may be trained (and likely retrained at a frequent interval, e.g., every few hours, days, weeks, or the like) using data collected from earlier-observed CDN activity and the associated accounts and distributions, allowing for custom fraud detection that is specific to a CDN and can improve itself over time as more training data is made available and/or to accommodate changes in fraudster behavior.

Based on the distribution fraud score, the fraud detection service 300 (or another service, which may call the fraud detection service 300 via an API to request a fraud score) can perform an action in response. For example, in some embodiments, the fraud detection service 300 may evaluate the distribution fraud score with regard to a set of one or more thresholds to determine a responsive action.

For example, when the distribution fraud score is larger than a top threshold (e.g., 0.95 or 0.90), the fraud detection service 300 may cause the distribution to no longer be served by the CDN 114, e.g., by disabling the distribution (e.g., via updating the distribution data 310, notifying one or more POPs 180, or the like); alternatively, the fraud detection service 300 may cause the serving of traffic associated with the distribution to be throttled, e.g., only a particular number of requests over an amount of time are served, only a particular amount of bandwidth will be used to service requests over an amount of time, etc. Such a "top" threshold may be flexibly set to indicate what confidence of fraud is sufficient to justify immediately terminating or materially altering the service associated with the distribution in an automated manner, e.g., without further inquiry on the part of humans, etc. Thus, this threshold may be set fairly high in some embodiments so that only egregious, clearly fraudulent activity is immediately shut down or restricted.

As another example, the fraud detection service 300 may utilize a second threshold (e.g., 0.70, 0.75, or the like) so that when a distribution fraud score (e.g., 0.83) is larger than the second threshold (e.g., 0.75) but smaller than the first threshold (e.g., 0.95), one or more less-severe actions can be performed. For example, if the action corresponding to surpassing the first threshold is terminating service for the distribution, the action corresponding to surpassing the second threshold (but not surpassing the first threshold) may include throttling the traffic associated with the distribution, transmitting a notification or other message to another system to cause further investigation into the distribution (e.g., to cause a human-involved investigation system to commence an investigation) or an account associated with the distribution, etc.

In some embodiments, the fraud detection service 300 may periodically (e.g., according to a schedule) generate distribution risk scores for all active distributions registered in the distribution data 310, e.g., every five minutes, thirty minutes, or the like.

However, in some embodiments there may be a large number of distributions, and many of the distributions may be clearly unrelated to impermissible byte streams and/or may be currently inactive or not very active, and thus investigation into them is not particularly beneficial for addressing the largest abusers. Accordingly, in some embodiments, a specific set of criteria is used to identify distributions to be analyzed, and only these distributions are analyzed to generate a distribution fraud score, or these distributions are analyzed first (e.g., according to an ordering) to more quickly respond to these distributions.

This selection criteria could involve one or more factors and may include positive criteria (for including distributions in the set to be analyzed) and/or negative criteria (for removing distributions from the set to be analyzed). For example, in some embodiments a positive criteria may include looking at distributions including data objects that are associated with video streams, e.g., by looking at filetypes of video content (e.g., .mp4, .movie) of data objects in the distribution and/or manifests (e.g., .m3u8, .ps) of data objects in the distribution, or the like.

In some embodiments, the negative criteria may also include, or be based on, selecting only a limited number of distributions matching the positive criteria, e.g., by only considering a top "X" number of distributions (e.g., in terms of bandwidth over a recent time period, in terms of requests per second (RPS) received over a recent time period) that stream video, for example.

The negative criteria may alternatively or additionally include removing from considering a set of distributions previously marked as being legitimate or associated with accounts that are marked as legitimate. For example, the negative criteria may remove a set of distributions from consideration that are associated with any accounts matching some criteria, e.g., have been a valid customer for some amount of time, have successfully paid for a particular amount of services over a particular amount of time, or the like.

In this manner, the analysis of distributions (e.g., obtaining of necessary data, generating distribution risk scores, and distribution risk score-based action analysis) may be limited to a subset of all distributions available or used in the CDN, and/or may be ordered according to criteria (e.g., according to bandwidth usage, RPS levels, or the like), to ensure timely responses to distributions having significant usage of the resources of the CDN.

Additionally, or alternatively, in some embodiments a particular distribution may be analyzed in an "on demand" manner responsive to a particular event being detected. For example, the CDN control plane 302 or CDN 114 itself may monitor characteristics of its top distributions and, upon detecting a particular percentage change (or raw amount change) of a metric such as RPS, bandwidth, etc., cause that distribution to be analyzed for an even faster response to a potentially fraudulent distribution. As another triggering event, the distribution may be analyzed at its time of creation, though embodiments performing such an analysis might wish to require a higher threshold distribution fraud score before taking an action due to the lack of visibility into how the distribution is actually being used (that would be visible via the CDN logs 312, for example).

Figure 4:
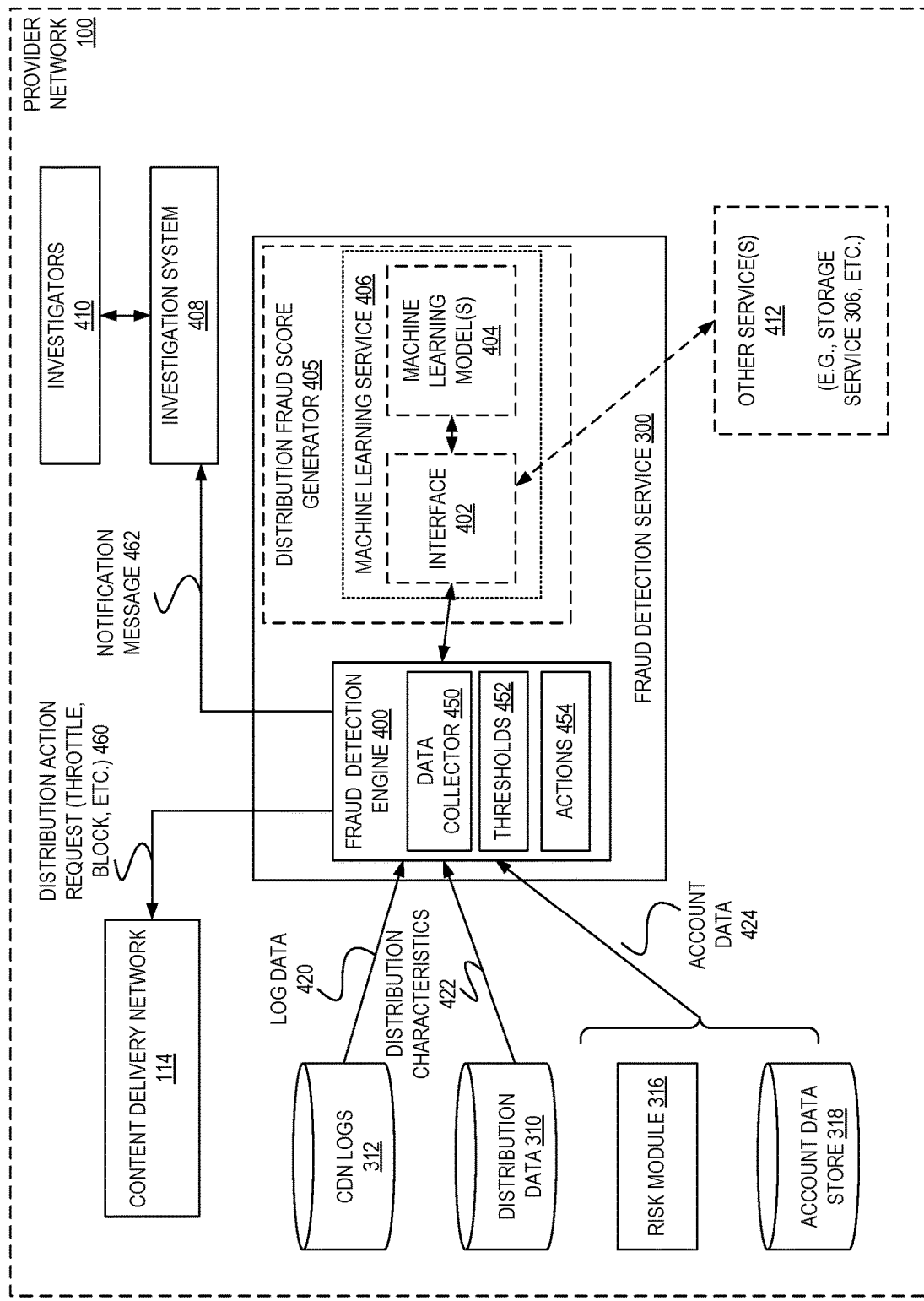
FIG. 4 is a diagram illustrating an environment including a fraud detection service for the detection of fraudulent use of content delivery network served byte streams according to some embodiments.

For further detail, FIG. 4 is a diagram illustrating an environment including a fraud detection service for the detection of fraudulent use of content delivery network served byte streams according to some embodiments. In this example, the fraud detection service 300 includes a fraud detection engine 400 to obtain distribution-associated data, trigger the analysis of individual distributions via use of one or more machine learning (ML) models, and cause the results of the analysis (e.g., distribution fraud scores) to be considered to determine what responsive action(s), if any, are to be performed.

For example, a data collector 450 component (e.g., function or routine, program, etc.) of the fraud detection engine 400 may periodically (or, on-demand) obtain log data 420, distribution characteristics 422, and/or account data 424 by sending requests to other services (e.g., microservices) for the data, querying databases or reading other data structures, sending API calls (e.g., to an account management service 314), or the like. This obtained data may be specific to a set of one or more distributions and/or accounts or may be more general and pertain to many distributions and/or accounts. The data collector 450 may then, for one distribution or for many distributions on an on-demand basis or scheduled basis, assemble the data into input data to be used by a distribution fraud score generator 405 The distribution fraud score generator 405 may use ones of these data elements of the input data to generate a distribution-specific fraud score, which may be based on a set of heuristics or rules, a statistical model, one or more machine learning models, or the like. For example, in some embodiments the distribution fraud score generator 405 includes an interface 402 (e.g., an IP endpoint within the provider network associated with one or more hosted machine learning models 404) that receives a request to generate a distribution fraud score along with (or otherwise identifying) the input data, and provides the input data to one or more machine learning models 404 to generate a distribution fraud score, which is returned to the fraud detection engine 400. The one or more machine learning models 404 may be any of a variety of types of models trained according to algorithms known to those of skill in the art, ranging from classification to anomaly detection approaches, using simple regression classifiers, deep neural networks, reinforcement learning techniques (configured to seek an increase of legitimate traffic in the CDN while decreasing illegitimate traffic, for example), or even combinations thereof. The one or more machine learning models 404 may be provided by a separate machine learning service 406 of the provider network, such as SageMaker provided by Amazon Web Services.

The fraud detection engine 400 may then analyze the returned distribution fraud score using one or more thresholds 452 to identify any actions 454 associated with the distribution fraud score. The thresholds 452 may be statically defined or may be dynamic in nature. For example, in some embodiments the thresholds 452 may be set based on performing an analysis of how much (and/or how little) fraud was detected at different threshold values, how much (and/or how little) the detected fraud was legitimate fraud and/or not fraudulent at different thresholds, etc., thus allowing for a threshold to be moved up (e.g., to cause less distribution activity to fall within a particular risk score range, which may make less distribution activity be deemed fraudulent) or moved down (and thus, cause more distribution activity to fall within a particular risk score range, which may make comparatively more distribution activity be deemed fraudulent). Additionally, or alternatively, a threshold (and/or one or more actions 454 associated with that particular threshold or range) may be adjusted based on performance characteristics of the CDN. For example, in some embodiments the fraud detection engine 400 may obtain performance characteristic data associated with the CDN (e.g., a current "load" such as one or more traffic metric), and based on the performance characteristic data, modify the threshold (and/or one or more associated actions 454) to cause comparatively more or less distribution activity to be viewed as fraudulent or possibly fraudulent via changing thresholds and/or to cause actions associated with actions to be more or less impactful. As one example, if the performance characteristic data indicates that the CDN is highly loaded/busy, the fraud detection engine 400 may cause a top threshold (e.g., designed to detect distributions that need to be shut down, throttled, etc.) to be lowered or relaxed, allowing for comparatively more distributions to be shut down, throttled, etc., and/or may cause one or more actions associated with a threshold to be more impactful (e.g., causing more throttling to be performed, or changing a throttle to instead be a termination of service) upon the distributions. In contrast, if the performance characteristic data indicates that the CDN is not highly loaded/busy, the fraud detection engine 400 may cause a top threshold (e.g., designed to detect distributions that need to be shut down, throttled, etc.) to be increased or heightened, allowing for comparatively fewer distributions to be shut down, throttled, etc., and/or may cause one or more actions associated with a threshold to be less impactful (e.g., causing less throttling to be performed, causing less termination of service, etc.) upon the affected distributions.

The fraud detection engine 400 may then cause the associated action(s) to be performed, for example, by using a CDP control plane component to send a distribution action request 460 (e.g., to block or throttle a distribution) to the CDN 114, by sending a notification message 462 to an investigation system 408 providing a set of automated and/or human investigators 410 with details involving the distribution and the detection of the possible fraud. For example, in some embodiments the ML models 404 may return, with the distribution fraud score, identifiers of which one(s) of the data elements were most heavily relied upon to yield the distribution fraud score (and optionally weights corresponding to these elements)—e.g., a first data element was a large factor in the resultant score while a second data element was not as large of a factor. In such cases, the fraud detection engine 400 may include indications of these data elements (and optionally the corresponding weights) within the notification message 462, providing more precise insight to the investigators into why the distribution might be fraudulent.

In some embodiments, other services 412 of the provider network may also be able to utilize the one or more ML models 404, e.g., via calling the interface 402 with a request to generate a distribution fraud score for a particular distribution. For example, a storage service 306 may seek to obtain a distribution fraud score associated with a distribution that it hosts data objects for, and based on the score it obtains, it may also perform automated actions to reduce fraud, e.g., by blocking serving objects from storage, by deleting objects, by restricting access to objects in storage, by sending a notification to an account holder associated with storage, etc. In such cases, the resulting distribution fraud scores may also be provided back to the fraud detection engine 400, which may analyze the score and itself perform responsive actions when determined necessary.

In some embodiments, upon determining that a distribution is sufficiently likely to be fraudulent, the fraud detection service 300 may detect similarities between that distribution and other distributions to detect other distributions that are fraudulent (but have not yet been detected) or will be fraudulent. For example, upon finding a very likely fraudulent distribution, a list of fraudulent origin server locations (e.g., URLs) of data for the distribution can be compared to origin server locations of other distributions to seek out commonalities—often, fraudsters will use similar origin servers or the same origin servers to commit fraud via different distributions. Thus, these other distributions can be analyzed and perhaps proactively addressed before the fraud might even occur, or before the fraud rises to a significant level.

In some embodiments, the one or more machine learning models 404 can be "continuously" (e.g., periodically, such as once or twice a day, one or more times a week, etc.) retrained using additional samples labeled as fraudulent or non-fraudulent, allowing the one or more machine learning models 404 to catch new fraudulent behaviors/patterns over time. For example, it is typical for fraudsters to use a same technique for an amount of time, but then change to repeatedly use a different technique later (e.g., when the first technique is no longer working well).

As indicated herein, a variety of types of data associated with distributions, CDN logs, and accounts can be utilized for distribution fraud analysis and scoring. FIG. 5 is a diagram illustrating exemplary log data types, distribution characteristic types, and account data types useful for the detection of the fraudulent use of content delivery network served byte streams according to some embodiments.

Several exemplary log data types 505 that can be used include ones of the following, though other types may also be used that are known to those of skill in the art. For example, the data elements may include the request volume (e.g., requests/second) of a distribution, the bandwidth used (e.g., in last minute, 5 minutes, etc.) for a distribution, a change of request volume and/or bandwidth compared to previous levels for the distribution, the Referrer (e.g., the URL, domain, or IP address associated with a web page that caused clients to request the data object from the CDN; e.g., such information is passed in an HTTP GET request sent by clients for a data object); IP addresses/network identifiers of the requesting clients of a distribution, the number or change of clients requesting content from the distribution over a period of time, identifiers of requesting device types (e.g., browser types, operating system types), which data objects are being requested and/or with what frequency or ordering, the network or geographic locations of requesting devices, etc.

Several exemplary distribution characteristic types 510 that can be used include ones of the following, though other types may also be used that are known to those of skill in the art. For example, the data elements may include one or more of a filename (or portion thereof) of a manifest file in the distribution, an indication of whether the manifest and/or objects associated therewith are protected via digital rights management (DRM) systems (as fraudsters often do not enable such features, whereas legitimate media owners do), identifiers of the file types of data objects, distribution creation dates/times (e.g., the age of the distribution), origin identifiers (or portions thereof) of the data objects of a distribution (e.g., URLs), attributes of the origin identifiers (e.g., length, naming patterns therein, a measure of randomness, domains), etc.

Several exemplary account data types 515 that can be used include ones of the following, though other types may also be used that are known to those of skill in the art. For example, the data elements may include one or more of an account risk score (e.g., generated by an accounting/billing service based on account data), an age of the account, a payment source/type used for the account (e.g., prepaid cards), a name associated with the account, a mailing or billing address (or portion thereof, e.g., a ZIP code), an email address (or portion, e.g., domain) associated with the account, a phone number (or portion, e.g., area code) associated with the account, whether a government identifier (e.g., tax ID such as an Individual Taxpayer Identification Number (ITIN) or social security number (SSN)) was provided for the account, a credit score obtained based on information in the account, whether the account has associated accounts (e.g., it is associated with a longstanding customer account of the provider network), an account risk score of the associated account(s), an identifier of whether the account was previously marked as potentially fraudulent, etc.

Figure 6:
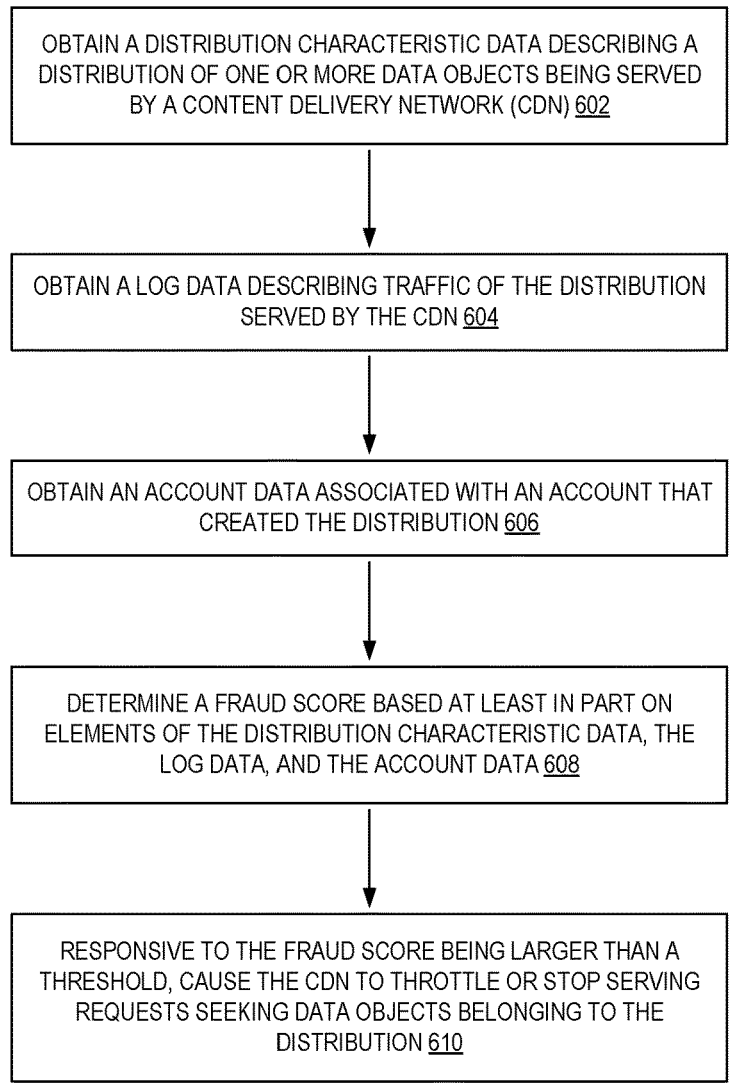
FIG. 6 is a flow diagram illustrating operations of a method for detecting the fraudulent use of content delivery network served byte streams according to some embodiments.

FIG. 6 is a flow diagram illustrating operations of a method for detecting the fraudulent use of content delivery network served byte streams according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by fraud detection service 300 of the other figures.

The operations 600 include, at block 602, obtaining distribution characteristic data describing a distribution of one or more data objects being served by a content delivery network (CDN).

In some embodiments, the distribution characteristic data includes one or more of: a date or time when the distribution was created; an origin identifier for the one or more data objects, wherein the origin comprises a uniform resource location (URL), a domain, or an internet protocol (IP) address; or an attribute of the origin identifier or portion of the origin identifier.

In some embodiments, the distribution characteristic data includes one or more of: a filename of a manifest file within the one or more data objects of the distribution; or an indication of whether the one or more of the one or more data objects of the distribution are protected via a digital rights management (DRM) system.

In some embodiments, the distribution characteristic data includes a file type of one or more of the one or more data objects of the distribution.

The operations 600 further include, at block 604, obtaining log data describing traffic of the distribution served by the CDN.

In some embodiments, the log data includes one or more of: a uniform resource location (URL), a domain, or an internet protocol (IP) address of a website that is referring clients to request the one or more data objects of the distribution; one or more IP addresses of one or more clients that have requested the one or more data objects of the distribution; a number of clients over an amount of time that have requested the one or more data objects of the distribution; or one or more identifiers of one or more device types of clients over an amount of time that have requested the one or more data objects of the distribution.

In some embodiments, the log data includes one or more of: a number of requests per unit of time associated with the one or more data objects of the distribution; or an amount of bandwidth over an amount of time utilized by the CDN to send the one or more data objects of the distribution.

The operations 600 further include, at block 606, obtaining account data associated with an account that created the distribution.

In some embodiments, the account data includes one or more of: a risk score of the account; an age of the account; an email address, mailing address portion, phone number portion, or payment method associated with the account; or a current status of the account.

At block 608, the operations 600 further include determining a fraud score based at least in part on elements of the distribution characteristic data, the log data, and the account data. Block 608 may include generating input data based on the elements of the distribution characteristic data, the log data, and the account data, and providing the input data to a distribution fraud score generator (e.g., a software component executed by one or multiple computing devices), which may utilize heuristics and/or one or more machine learning models to generate a fraud score.

At block 610, the operations 600 further include responsive to the fraud score being larger than a threshold, causing the CDN to throttle or stop serving requests seeking data objects belonging to the distribution. The threshold may be static or dynamic. For example, in some embodiments, the threshold (and/or an associated action) may be modified based on historic detection activity and/or performance characteristic data associated with the CDN, e.g., based on how busy/loaded the CDN is at a current point in time, recent point in time, at a future time (e.g., based on predictions of activity), etc.

In some embodiments, the operations 600 further include providing a second input data to the ML model to determine a second fraud score associated with a second distribution; and responsive to the second fraud score being less than the threshold but larger than a second threshold, transmitting a message indicating that the second distribution is likely associated with fraudulent activity. In some embodiments, the message identifies one or more specific data elements as being associated with a relatively high likelihood of fraud, wherein the one or more specific data elements are from one or more of the distribution characteristic data, the log data, and the account data.

In some embodiments, the operations 600 further include identifying an origin server associated with the distribution; identifying a second distribution of a second account as also utilizing the origin server; and based at least in part on the identifying the second distribution as also utilizing the origin server, transmitting a message indicating that the second account or second distribution has a likelihood of potential fraud or updating a record in a data store to indicate that the second account or second distribution has a likelihood of potential fraud.

In some embodiments, the operations 600 further include receiving, at an endpoint associated with a fraud detection service in a multi-tenant service provider network, a request originated by another service of the service provider network for a fraud score that identifies a second distribution; providing data associated with the second distribution to the ML model to generate a second fraud score for the second distribution; and transmitting, to the another service, the second fraud score, wherein the obtaining the distribution characteristic data, obtaining the log data, obtaining the account data, providing the input data to the ML model, and the causing the CDN to throttle or stop servicing requests is performed by the fraud detection service.

Figure 7:
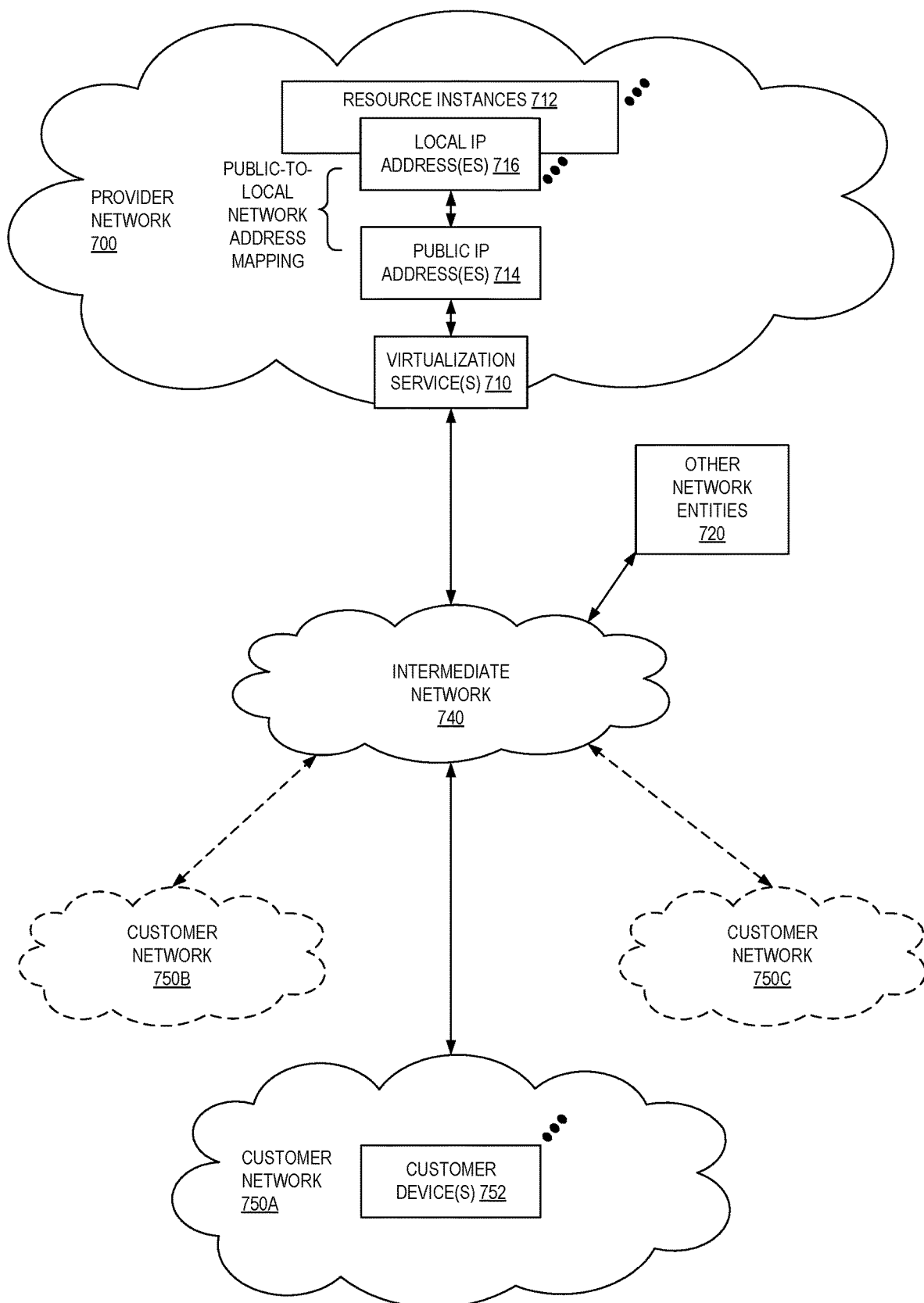
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
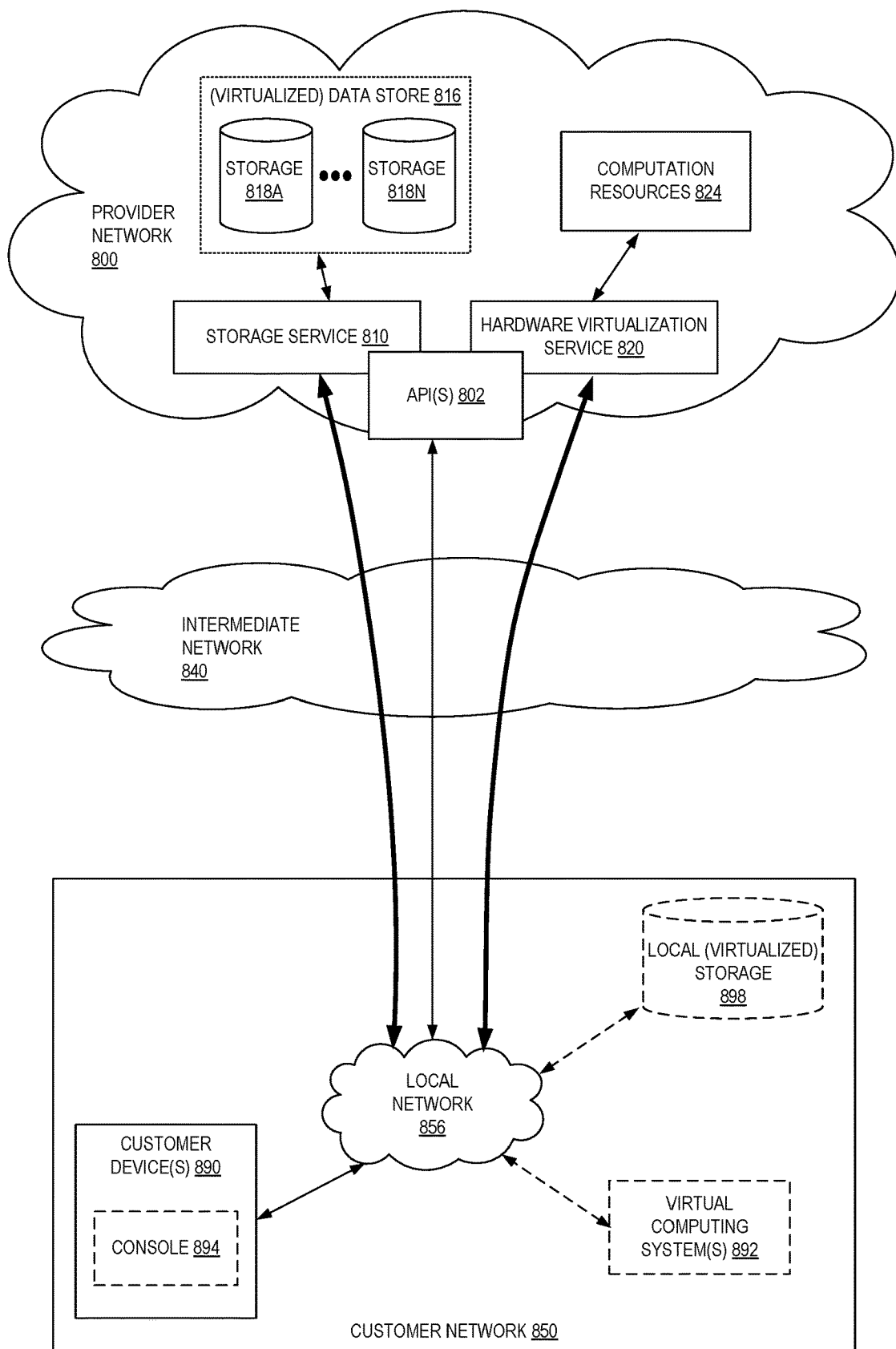
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative Systems

Figure 9:
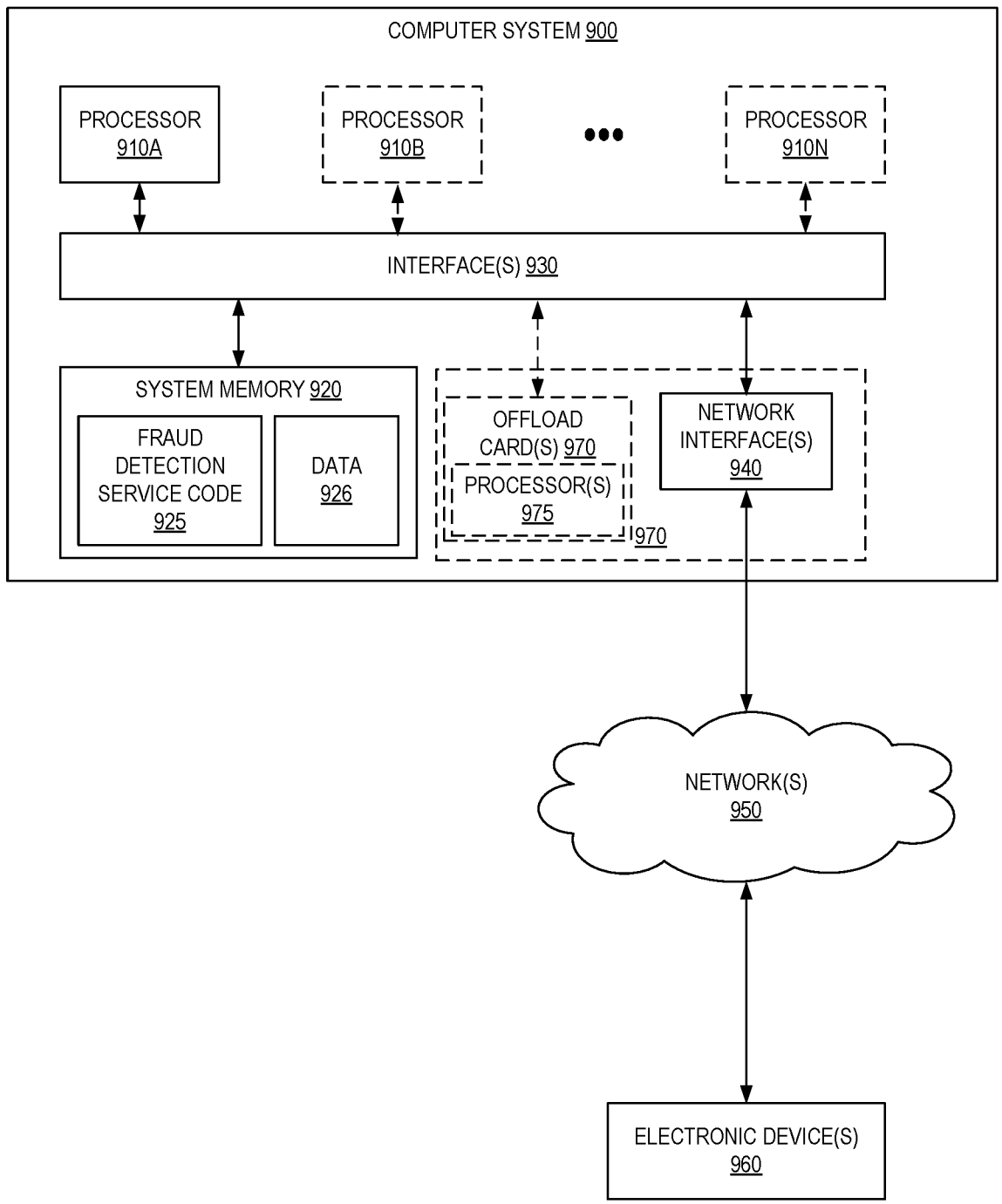
FIG. 9 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910

(e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as fraud detection service code 925 (e.g., executable to implement, in whole or in part, the fraud detection service 300) and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    identifying, by a fraud detection service using one or more processors, a first content distribution from a plurality of content distributions served by a content delivery network (CDN), wherein the identifying includes selecting a set of content distributions from the plurality of content distributions having a largest amount of requests or utilizing a largest amount of bandwidth over a period of time, and removing, from the set of content distributions, those content distributions that are associated with an account satisfying a condition;
    obtaining, by the fraud detection service, distribution characteristic data describing the first content distribution;
    obtaining, by the fraud detection service, log data describing traffic of the first content distribution;
    obtaining, by the fraud detection service, account data associated with an account that created the first content distribution;
    providing, by the fraud detection service, input data to a machine learning (ML) model to determine a fraud score, the input data being based at least in part on elements of the content distribution characteristic data, the log data, and the account data; and
    responsive to the fraud score being larger than a first threshold, causing, by the fraud detection service, the CDN to throttle or stop serving requests seeking data objects belonging to the first content distribution.

2. The computer-implemented method of claim 1, further comprising:
    providing second input data to the ML model to determine a second fraud score associated with a second distribution from the identified one or more distributions; and
    responsive to the second fraud score being less than the first threshold but larger than a second threshold, transmitting a message indicating that the second distribution is likely associated with fraudulent activity.

3. The computer-implemented method of claim 2, wherein the message identifies one or more specific data elements as being associated with a relatively high likelihood of fraud, wherein the one or more specific data elements are from at least one of the distribution characteristic data, the log data, or the account data.

4. A computer-implemented method comprising:
    obtaining, by a fraud detection service using one or more processors, distribution characteristic data describing a distribution of one or more data objects being served by a content delivery network (CDN);
    obtaining, by the fraud detection service, log data describing traffic of the distribution of one or more data objects served by the CDN;
    obtaining, by the fraud detection service, account data associated with an account that created the distribution of one or more data objects;
    determining a fraud score based at least in part on elements of the distribution characteristic data, the log data, and the account data; and
    responsive to the fraud score being larger than a threshold, causing the CDN to throttle or stop serving requests seeking data objects belonging to the distribution of one or more data objects.

5. The computer-implemented method of claim 4, further comprising:
    determining a second fraud score associated with a second distribution; and
    responsive to the second fraud score being less than the threshold but larger than a second threshold, transmitting a message indicating that the second distribution is likely associated with fraudulent activity.

6. The computer-implemented method of claim 5, wherein the message identifies one or more specific data elements as being associated with a relatively high likelihood of fraud.

7. The computer-implemented method of claim 4, wherein the distribution characteristic data includes one or more of:
    a date or time when the distribution was created;
    an origin identifier for the one or more data objects, wherein the origin identifier comprises a uniform resource location (URL), a domain, or an internet protocol (IP) address;
    an attribute of the origin identifier or portion of the origin identifier;
    a filename of a manifest file within the one or more data objects of the distribution;
    an indication of whether the one or more of the one or more data objects of the distribution are protected via a digital rights management (DRM) system; or
    a file type of one or more of the one or more data objects of the distribution.

8. The computer-implemented method of claim 4, wherein the account data includes one or more of:
    a risk score of the account;
    an age of the account;
    an email address, mailing address portion, phone number portion, or payment method associated with the account; or
    a current status of the account.

9. The computer-implemented method of claim 4, wherein the log data includes one or more of:
    a uniform resource location (URL), a domain, or an internet protocol (IP) address of a website that is referring clients to request the one or more data objects of the distribution;
    one or more IP addresses of one or more clients that have requested the one or more data objects of the distribution;
    a number of clients over an amount of time that have requested the one or more data objects of the distribution;
    one or more identifiers of one or more device types of clients over an amount of time that have requested the one or more data objects of the distribution;
    a number of requests per unit of time associated with the one or more data objects of the distribution; or
    an amount of bandwidth over an amount of time utilized by the CDN to send the one or more data objects of the distribution.

10. The computer-implemented method of claim 4, further comprising:
    obtaining data indicating a current level of utilization of the CDN; and
    based at least in part on the obtained data, changing the threshold from an old value to a new value or changing an action to be performed responsive to the threshold being satisfied.

11. The computer-implemented method of claim 10, wherein:
    the obtained data indicates that the current level of utilization of the CDN reflects a high amount of utilization; and either the new value of the threshold is smaller than the old value of the threshold, or the action associated with the threshold is changed to one that is more restrictive of traffic of an associated distribution.

12. The computer-implemented method of claim 4, wherein determining the fraud score based at least in part on elements of the distribution characteristic data, the log data, and the account data comprises:
   generating an input data based on the elements of the distribution characteristic data, the log data, and the account data; and
   providing the input data to a distribution fraud score generator, the distribution fraud score generator including at least one or more machine learning (ML) models.

13. The computer-implemented method of claim 4, further comprising:
   identifying an origin server associated with the distribution;
   identifying a second distribution of a second account as also utilizing the origin server; and
   based at least in part on the identifying the second distribution as also utilizing the origin server, transmitting a message indicating that the second account or second distribution has a likelihood of potential fraud or updating a record in a data store to indicate that the second account or second distribution has a likelihood of potential fraud.

14. The computer-implemented method of claim 4, further comprising:
   receiving, at an endpoint associated with a fraud detection service in a multi-tenant service provider network, a request originated by another service of the service provider network for a fraud score that identifies a second distribution;
   determining a second fraud score for the second distribution; and
   transmitting, to the another service, the second fraud score,
   wherein the obtaining the distribution characteristic data, obtaining the log data, obtaining the account data, determining the fraud score, and the causing the CDN to throttle or stop servicing requests is performed by the fraud detection service.

15. A system comprising:
   a first one or more electronic devices to implement a content distribution network (CDN), associated with a multi-tenant provider network, to service requests for data objects belonging to distributions; and
   a second one or more electronic devices to implement a fraud detection service in a region of the multi-tenant provider network, the fraud detection service including instructions that upon execution by one or more processors cause the fraud detection service to:
      obtain distribution characteristic data describing a distribution of one or more data objects being served by the CDN;
      obtain log data describing traffic of the distribution of one or more data objects served by the CDN;
      obtain account data associated with an account that created the distribution of one or more data objects;
      determine a fraud score based at least in part on elements of the distribution characteristic data, the log data, and the account data; and
      responsive to the fraud score being larger than a threshold, cause the CDN to throttle or stop serving requests seeking data objects belonging to the distribution of one or more data objects.

16. The system of claim 15, wherein the fraud detection service further includes instructions that upon execution by the one or more processors cause the fraud detection service to:
   determining a second fraud score associated with a second distribution; and
   responsive to the second fraud score being less than the threshold but larger than a second threshold, transmit a message indicating that the second distribution is likely associated with fraudulent activity.

17. The system of claim 16, wherein the message identifies one or more specific data elements as being associated with a relatively high likelihood of fraud.

18. The system of claim 15, wherein:
   the distribution characteristic data includes one or more of:
      a date or time when the distribution was created;
      an origin identifier for the one or more data objects, wherein the origin comprises a uniform resource location (URL), a domain, or an internet protocol (IP) address; or
      an attribute of the origin identifier or portion of the origin identifier; and
   the account data includes one or more of:
      a risk score of the account;
      an age of the account;
      an email address, mailing address portion, phone number portion, or payment method associated with the account; or
      a current status of the account.

19. The system of claim 15, wherein the fraud detection service further includes instructions that upon execution by the one or more processors cause the fraud detection service to:
   obtain data indicating a current level of utilization of the CDN; and
   based at least in part on the obtained data, change the threshold from an old value to a new value or changing an action to be performed responsive to the threshold being satisfied.

20. The system of claim 15, wherein the log data includes one or more of:
   a uniform resource location (URL), a domain, or an internet protocol (IP) address of a website that is referring clients to request the one or more data objects of the distribution;
   one or more IP addresses of one or more clients that have requested the one or more data objects of the distribution;
   a number of clients over an amount of time that have requested the one or more data objects of the distribution; or
   one or more identifiers of one or more device types of clients over an amount of time that have requested the one or more data objects of the distribution.

\* \* \* \* \*